(12) United States Patent
Bachmann et al.

(10) Patent No.: US 8,170,010 B2
(45) Date of Patent: May 1, 2012

(54) MULTIPLE INTERFACE MOBILE NODE WITH SIMULTANEOUS HOME- AND FOREIGN NETWORK CONNECTION

(75) Inventors: Jens Bachmann, Langen (DE); Kilian Weniger, Langen (DE)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/067,137

(22) PCT Filed: Jan. 8, 2006

(86) PCT No.: PCT/EP2006/007611
§ 371 (c)(1),
(2), (4) Date: Jun. 26, 2008

(87) PCT Pub. No.: WO2007/039007
PCT Pub. Date: Apr. 12, 2007

(65) Prior Publication Data
US 2008/0253382 A1    Oct. 16, 2008

(30) Foreign Application Priority Data
Sep. 19, 2005 (EP) .................................. 05020354

(51) Int. Cl.
*H04L 12/28* (2006.01)
(52) U.S. Cl. ........................................ 370/389; 370/400
(58) Field of Classification Search .................. 370/389, 370/400
See application file for complete search history.

(56) References Cited

U.S. PATENT DOCUMENTS

| | | | |
|---|---|---|---|
| 6,578,085 B1 * | 6/2003 | Khalil et al. .................. | 709/241 |
| 6,804,221 B1 * | 10/2004 | Magret et al. .................. | 370/338 |
| 6,892,069 B1 | 5/2005 | Flynn | |
| 2003/0079027 A1 * | 4/2003 | Slocombe et al. ............. | 709/229 |
| 2004/0095943 A1 * | 5/2004 | Korotin .......................... | 370/401 |
| 2004/0107234 A1 | 6/2004 | Rajahalme | |
| 2004/0109472 A1 | 6/2004 | Choyi | |
| 2004/0136337 A1 | 7/2004 | Warrier | |
| 2006/0149814 A1 * | 7/2006 | Borella ........................... | 709/204 |
| 2006/0274672 A1 * | 12/2006 | Venkitaraman et al. ...... | 370/254 |

OTHER PUBLICATIONS

Cicso, Proxy ARP, Documnet ID : 13718, 4 pages.*
T. Narten, et al., "Neighbor Discovery for IP version 6 (IPv6)," IETF Standard-Working-Draft, Internet Engineering Task force, IETF, CH, vol. ipv6, No. 3, May 2005.

* cited by examiner

*Primary Examiner* — Ayaz Sheikh
*Assistant Examiner* — Mounir Moutaouakil
(74) *Attorney, Agent, or Firm* — Dickinson Wright PLLC

(57) ABSTRACT

The invention relates to a method for node management in a packet-switched network, wherein a first node acts as a proxy for a second node, both nodes having network-layer addresses and link-layer addresses, the network-layer addresses at the network layer and the link-layer addresses at the link layer being used for communication in the packet-switched network. The method comprises the following steps performed by the first node: The first node receives from the second node a request to receive and forward packets addressed to the second node's network-layer address, whereby the same network-layer address is associated with the first node and the second node, and the first node and the second node have distinct link-layer addresses. The first node advertises to nodes attached to the packet-switched network the first node's link-layer address as a destination address for the second node's network-layer address, while the second node does not advertise. The first node receives in response to advertising, packets destined to the second node's network-layer address having the first node's link-layer address; and forwards packets addressed to the second node's network-layer address to the second node using its link-layer address.

13 Claims, 5 Drawing Sheets

Packet delivery to Mobile Node in Home Network

Figure 1: Use of multiple links in Foreign Networks

Figure 2: Registering home-link interface with Home Agent

Figure 3: Packet delivery to Mobile Node in Home Network

Figure 4: General Scenario

MULTIPLE INTERFACE MOBILE NODE WITH SIMULTANEOUS HOME- AND FOREIGN NETWORK CONNECTION

FIELD OF THE INVENTION

The invention relates to improved service quality for a Mobile Node with multiple interfaces and simultaneous home- and foreign-network connections.

BACKGROUND OF THE RELATED ART

The current version of the internet protocol (IPv4) has proven to be robust easily implementable as well as interoperable and has stood the test of scaling and in the end work to a global utility the size of today's internet. It has not been substantially changed since 1981.

There are several points that the initial design did not anticipate, including the recent exponential growth of the internet and therefore the exhaustion of the IPv4 address space, the growth of the internet and the ability of the internet backbone to maintain larger routing tables, the need for simple configuration, the requirement for security at the IP level, the need for better support for real time delivery of data (Quality of Service) and increased mobility.

To address these concerns a suite of protocols and standards known as IPv6 has been developed. IPv6 has been designed to be an evolutionary step from IPv4 and natural increments.

All of IPv4's routing algorithms can be used to route IPv6, the only difference being that the addresses in IPv6 are 128 bit long, whereas those in IPv4 are 32 bits in length. New routing capabilities in IPv6 include provider selection, host mobility and auto-readdressing.

With IPv6 neighbor discovery IPv6 solves problems that are related to the interaction between nodes that are attached to the same links. These include, amongst others, router discovery, address resolution, next-stop determination, and neighbor unreachability detection, redirect and neighbor advertisement.

Routing is based on the subnet prefix and the packet's destination IP address. Therefore, packets that are destined for a Mobile Node do not reach the Mobile Node when the Mobile node is not attached to its home link. The home link is the link where the Mobile Node's home IPv6 subnets prefix exists. Regardless of a Mobile Node's movement, a Mobile Node can change its IP address each time it moves to a new link in order to continue communication. However, the Mobile Node does not maintain transport and higher layer connections when it changes location. Hence, IPv6 mobility support is particularly important when recognizing that mobile computers and phones with computing capabilities become a significant population of the Internet in the future.

IPv6 enables a Mobile Node to move from one link to another without changing the Mobile Node's IP address. IPv6 mobility assigns an IP address to the Mobile Node within its home subnet prefix on its home link. This address is known as the node's Home Address (HoA). Therefore, packets that are routed to the Mobile Node's Home Address reach their destination regardless of the Mobile Node's current point of attachment to the Internet, and the Mobile Node can continue communication with other nodes after moving to a new link.

In principle, the same basic components exist in Mobile IPv6 as in Mobile IPv4 except that there are no foreign agents in Mobile IPv6. When a Mobile Node is at home, packets addressed to its Home Address are routed to the Mobile Node's home link using conventional internet routing mechanisms. When a Mobile Node moves to a foreign link the Mobile Node will receive a Care of Address (CoA) and will then send a Binding Update to the Home Address with the Mobile Node's new Care of Address for use while roaming.

After the Mobile Node registers its Care of Address the Home Agent performs proxy neighbor discovery, which means that the home agent multicasts neighbor advertisement on behalf of the Mobile Node. Packets are then sent for the Mobile Node with IPv6 encapsulation.

The following description is based on the standard language used in IP. The link layer normally includes the device driver in the operating system and the corresponding network interface card and the computer. Together they handle all the hardware details of physically interfacing with the cable or whatever type of media is being used. The network layer handles the movement of packets around the network. For example the routing of packets takes place here. The link layer is the lowest layer in the Internet protocol suite.

With Mobile IPv6 a Mobile Node (MN) is reachable by its Home Address even when away from home. For this the MN is associated with a Care-of Address (CoA), which provides information about the Mobile Node's current location. The Home Agent (HA) of the MN and also a Correspondent Node (CN) set up a binding between the Home Address and the Care-of Address in a cache and packets destined for the Mobile Node are directly sent to the Care-of Address. If the MN is at its home network, it deregisters the Care-of Address and receives packets directly with its Home Address.

In order to allow a HA to intercept traffic for a node the proxy Neighbor Advertisements of the Neighbor Discovery protocol are used. According to Mobile IPv6 if there is a Binding Cache entry in the HA for a MN, the HA sends proxy Neighbor Advertisements so that the Neighbor Cache entries of the Nodes in the vicinity of the HA are updated and all traffic to the MN is sent to the link-layer address of the HA.

In the IETF discussions are ongoing how to enhance Mobile IPv6 to support Mobile Nodes with multiple interfaces This simultaneous use of the multiple interfaces increases service quality for the terminals and makes better use of the network capacity.

It is proposed to allow multiple bindings (i.e. multiple Care-of Addresses per Home Address) with filter mechanisms in the HAs to tunnel on per-flow basis to different CoAs (see FIG. 1). For this the Binding Update can for example contain the flow label of the IPv6 header as filter. Further a new bit is introduced in the Binding Update informing HAs about multiple simultaneous bindings. In FIG. 1 an MN connected to two foreign networks is shown. The MN has registered the two CoAs and filter parameters with the Home Agent and receives one flow over foreign network 1 and another flow over foreign network 2.

The scenario addressed by this invention is based on the following general assumptions:

The MN has at least one Home Address (HoA) and multiple interfaces

The MN wants to use the same Home Address with multiple interfaces simultaneously for different flows The MN wants to use the multiple interfaces also when one interface is connected to the home network There may be several routers connected to the home link, i.e. Home Agent is not the only router on the home link When returning home, i.e. one of the MN's interfaces is attached to the home link, two possible approaches are described in the state of the art.

In the first approach the MN sends a BU to the HA with its Home Address as CoA and the home registration bit set and lifetime set to zero, to instruct its Home Agent to no longer intercept or tunnel packets for it. In this case the Home Agent deletes all the bindings from the Binding Cache and stops sending proxy Neighbor Advertisements. On the other hand the MN starts to send Neighbor Advertisements on the home link, so that the Neighbor Cache entries in the Routers are changed and all traffic is directly sent to the MN.

In the second approach the MN de-registers the binding for the interface on the home link and stops using the interface. In this case all traffic previously sent to the de-registered interface is then sent to the remaining registered interfaces according to the filter rules.

In both scenarios it is not possible for the MN to use the home link and a foreign link simultaneously.

The simple solution for the identified problem would be for the MN to acquire a Care-of Address even on its home link and not using the Home Address directly. Then instead of sending a BU with the HoA as CoA, the MN registers the CoA with the HA and sets the multiple bindings bit in the BU.

In addition it is required, that the MN deactivates the Home Address on the interface connected to the home link.

Major drawback of this solution is, that packets between HA and MN are IP encapsulated, this results in higher packet overhead, although the MN is connected to its home link and can receive packets directly sent to its HoA.

SUMMARY OF THE INVENTION

The present invention has been made in consideration of the above situation and has as its object to allow the Mobile Node to use one Home Address with multiple interfaces, even if one interface is connected to the home link, with no additional packet overhead.

The object is solved by the subject matter of the independent claims. Advantageous embodiments of the invention are subject matters to the dependent claims.

To achieve this object, the present invention provides a method and system for node management in a packet-switched network, in which a first node acts as a proxy for a second node. Both nodes have network-layer addresses and link-layer addresses, the network-layer addresses at the network layer and link-layer addresses at the link layer being used for communication in the packet-switched network. The first node receives from the second node a request to receive and forward packets addressed to the second node's network-layer address, whereby the same network-layer address is associated with the first node and the second node, and the first and second nodes have distinct link-layer addresses. The first node advertises to nodes attached to the packet-switched network its link-layer address as a destination address for the second node's network-layer address, while the second node does not advertise. In response to advertising the first node receives packets destined to the second node's network-layer address having the first node's link-layer address, and the first node forwards packets addressed to the second node's network layer address to the second node using its link-layer address.

According to an advantageous embodiment the first node and the second node are on the same link with at least one interface during the forwarding of packets addressed to the second node's network-layer address to the second node.

In another advantageous embodiment the packet-switched network is an IP network.

An advantageous aspect of the invention is that the first node is a Home Agent or a Media Converter or a Firewall.

In a further embodiment of the invention the second node is a Mobile Node.

According to a further advantageous embodiment the IP network is a Home Network.

In another advantageous embodiment of the invention the Mobile Node is simultaneously connected to the Home Network and a Foreign Network.

In a further embodiment of the invention the Home Agent maps the Mobile Node's network home address to the Mobile Node's link-layer address.

According to a further advantageous embodiment neighbor caches of the nodes attached to the packet-switched network are updated with the first node's link-layer address as a destination address for the second node's network-layer address.

In a further embodiment of the invention the advertising to nodes attached to the packet-switched network of the first node's link-layer address as a destination address for the second node's network-layer is stopped, and the second node advertises its link-layer address as a destination address for the second node's network-layer address.

Another embodiment of the invention relates to a system for node management in a packet-switched network, where the packet-switched network comprises a first node adapted to act as a proxy for a second node, both nodes having network-layer addresses and link-layer addresses, a network-layer address at the network layer and a link-layer address at the link-layer being used for communication in the packet-switched network. The first node is adapted to receive from the second node a request to receive and forward packets addressed to the second node's network-layer address, whereby the same network-layer address is associated with the first node and the second node and the first node and second node have distinct link-layer addresses. The first node is further adapted to advertise to nodes attached to the packet-switched network the first node's link-layer address as a destination address for the second node's network-layer address, while the second node does not advertise; and the first node is further adapted to receive a response to advertising, packets destined to the second node's network-layer address having the first node's link-layer address. The first node is further adapted to forward packets addressed to the second node's network-layer address to the second node using its link-layer address.

The Home Agent is doing proxy Neighbor Advertisements even if the Mobile Node is attached with one interface to the home link. For this the MN is not visible on the home link for other nodes except for the Home Agent. The MN informs the Home Agent about its link-layer address and the Home Agent forwards traffic destined for the MN to the link-layer address of the MN.

BRIEF DESCRIPTION OF THE DRAWINGS

Further features and advantages will become apparent from the following, and more particular description of the various embodiments of the invention as illustrated in the accompanying drawings, wherein.

DETAILED DESCRIPTION OF THE INVENTION

The following paragraphs will describe various embodiments of the invention, and illustrates further, alternative, configurations.

For illustrative purposes only, most of the embodiments are outlined in relation to an IP network, and the terminology used in the subsequent sections mainly relates to the IP terminology. However the used terminology and the description of the embodiments with respect to an IP architecture is not intended to limit the principles and ideas of the invention to such systems.

The present invention relates to a method where a Mobile Node can use multiple interfaces simultaneously to increase service quality and to make better use of the network capacity. A Home Agent in the home network and the Mobile Node are enhanced to support multiple Bindings and also to allow the simultaneous use of a foreign network with one Mobile Node interface and the home network with another Mobile Node interface.

In the following a solution is described where the MN can use one Home Address with multiple interfaces even if one interface is connected to the home link with no additional packet overhead. For this Neighbor Discovery is changed, i.e. the Home Agent of the MN is doing proxy Neighbor Discovery even if the MN is attached to the home link and further the MN does not send Neighbor Advertisements for the Home Address.

When the MN is entering the home network with one interface it receives Router Advertisements either by one of the routers or by a Home Agent. Because of the prefix the MN detects that it is the home link. For sending the Binding Update to the Home Agent the MN must learn the link-layer address of the Home Agent. If the received Router Advertisement was sent by the MN's Home Agent, identifiable by the Home Agent bit set and the global IP address in the Modified Prefix Information Option, the MN can learn the Home Agent's link-layer address by the Source Link-Layer Address option included in the Router Advertisement. If the received Router Advertisement was sent by another router, the MN can send a Neighbor Solicitation with its Home Address as target address to the Home Agent's solicited-node multicast address and the unspecified address as IP source address. Subsequently the HA will send a Neighbor Advertisement including its link-layer address to the all-nodes multicast address.

Now, on receipt of the Neighbor Advertisement, the MN can record the link-layer address of the HA in its Neighbor Cache entry and send a BU. In this Binding Update the MN includes the HoA as CoA and sets in addition a bit indicating that multiple bindings are used furthermore. Thus the HA knows that the MN is simultaneously connected to a foreign network and to the home network and that the HA has to continue doing proxy Neighbor Discovery for the MN.

Figure 1:
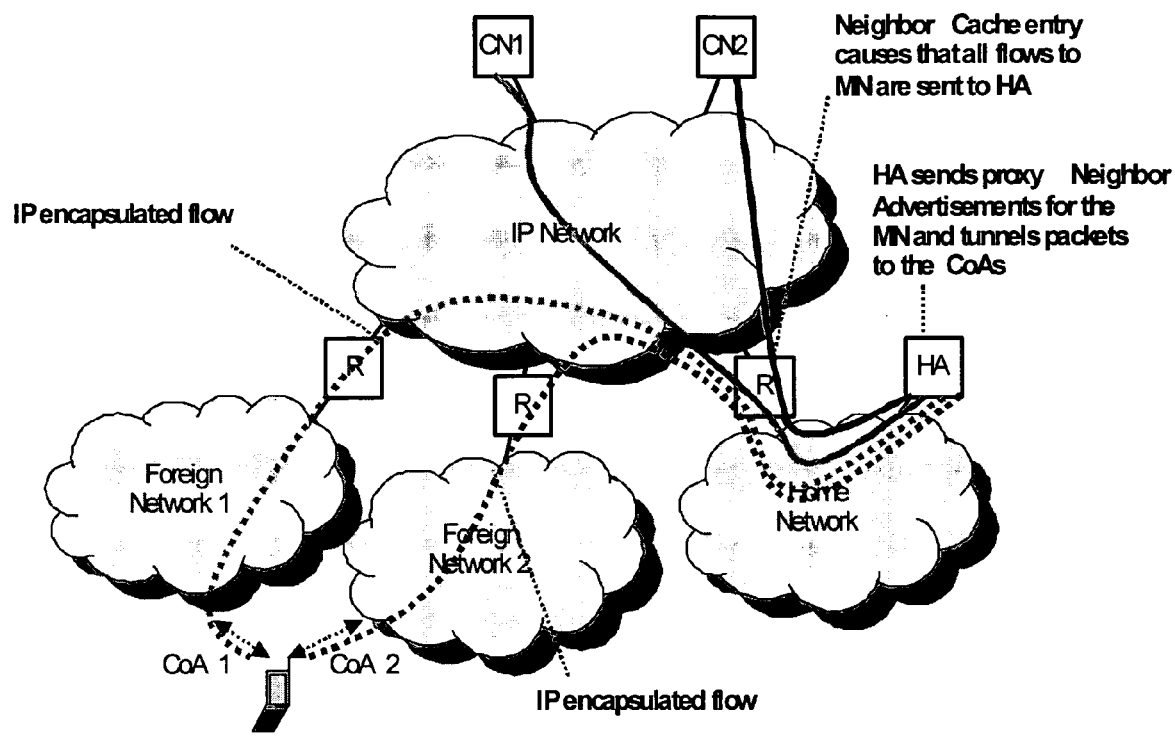
FIG. 1 shows the use of multiple links in Foreign Networks.
Figure 2:
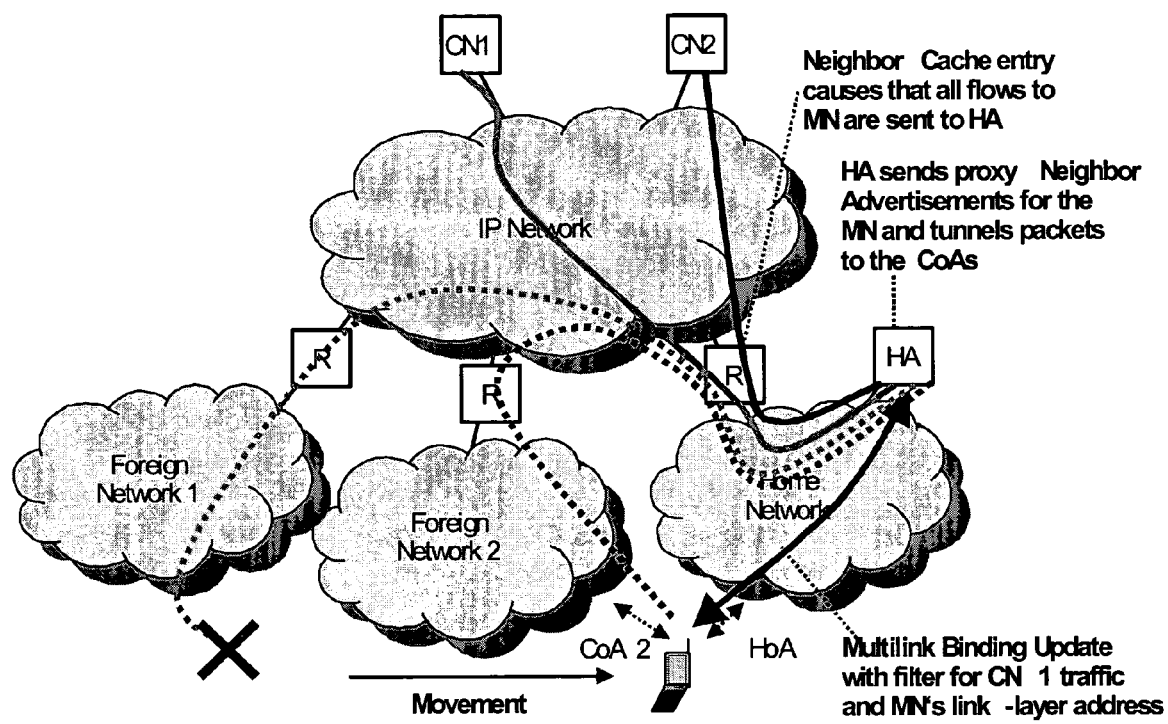
FIG. 2 shows the registering of the home-link interface with the Home Agent.

In addition to the filtering parameters for the flow, the MN includes its link-layer address in the BU (see FIG. 2). In FIG. 2 the MN is attached to the home network with one interface after movement. The MN registers its link-layer address together with some filter parameters with the Home Agent. Then the Home Agent updates its Binding Cache and its Neighbor Cache so that the entry for the MN's Home Address is mapped to the MN's link-layer address. Otherwise if the link-layer address was not included, the Home Agent would use the Neighbor Discovery protocol to determine the link-layer address of the MN. But because the Home Agent is doing proxy Neighbor Discovery for the MN, the HA would reply with its own link-layer address instead of the one from the MN.

The Home Agent will continue sending proxy Neighbor Advertisements for the MN even if the MN is attached with one interface to the home link. That means the Neighbor Advertisements received at the nodes on the link include the link-layer address of the HA and therefore the Neighbor Cache of the other nodes on the link is updated accordingly. The packets sent by the neighboring nodes (e.g. the Access Routers) to the Mobile Node are then transmitted to the Home Agent first.

The Home Agent can decide based on the filters in the Binding Cache entry on which path to send the packets to the MN. If the packets arriving at the HA are matching the MN's HoA and the filters for the home interface, they are not IP encapsulated and not tunneled to a CoA. These packets are forwarded to the link-layer and transferred directly to the MN using the link-layer address of the MN, available in the Neighbor Cache entry of the HA. Thus there is no additional IP encapsulation overhead (see FIG. 3).

Figure 3:
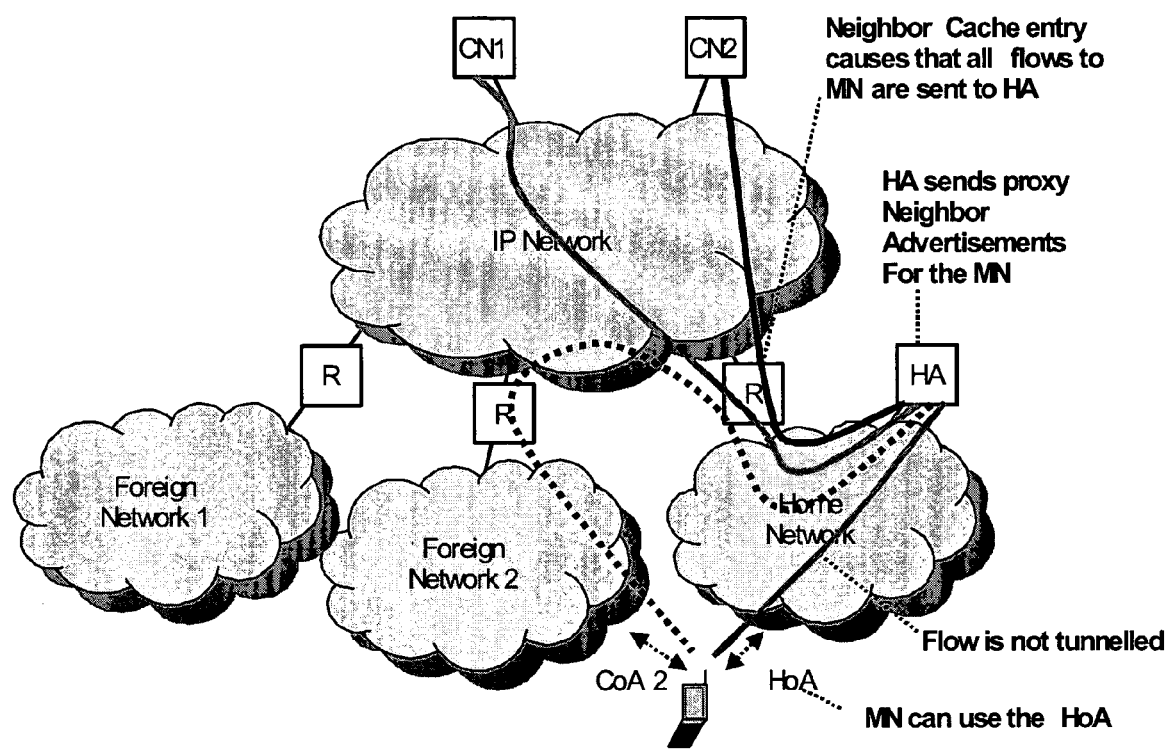
FIG. 3 shows the packet delivery to Mobile Node in Home Network.

In FIG. 3 the Home Agent sends traffic to the Mobile Node according to the filter parameters. One flow is tunneled to the Mobile Node's CoA2 via the foreign network and the other flow is sent directly to the interface attached to home link.

Modifications to the MN are also necessary, i.e. the MN is not allowed to answer to Neighbor Solicitations and to send Neighbor Advertisements. Therefore, the MN is not visible on the home link, which means the MN is off-link for other nodes, except for the Home Agent.

In the case the MN is attached to the home link with one interface and wants to send packets to a CN over this interface, it can transmit them to the default outgoing Access Router directly, with the Home Address as IP source address.

For this, if there is an outgoing packet scheduled, the Mobile Node must perform the next-hop determination to learn the IP address of the next-hop. Hence the Destination Cache is examined first if there is an entry for the destination IP address. If no entry exists, the MN performs a longest prefix match against the prefix list to determine whether the packet's destination is on- or off-link. If the destination is off-link a router from the Default Router List (e.g. the Home Agent) is selected.

Once the IP address of the next hop is known, the MN examines the Neighbor Cache for link-layer information about that neighbor. If there is no entry in the Neighbor Cache, the MN performs address resolution. But since the MN must not be visible on the home link for the neighbors, it sends a Neighbor Solicitation to the solicited-node multicast address with the unspecified address as IP source address, i.e. the Home Address is not used as IP source address. The target address of the Neighbor Solicitation is set to the IP address of the neighbor.

The neighbor will multicast a Neighbor Advertisement to the all-nodes address. In the Neighbor Advertisement the Target Link-Layer option is included and thus the MN is informed about the link-layer address of the neighbor and can update its Neighbor Cache.

Because communication to or through a neighbor may fail, the MN should track the reachability state for the neighbors to which it is sending packets. For this a timer is used waiting for a positive confirmation that the path is working properly. After the expiration of the timer, the MN sends a unicast Neighbor Solicitation to the neighbor. The neighbor responds with a Neighbor Advertisement to the source address of the MN. Because of the proxy Neighbor Advertisements of the Home Agent, the Home Agent is the receiver of the neighbor's Neighbor Advertisement. The Home Agent must forward this Neighbor Advertisement to the MN to confirm the reachability.

Redirect Messages are sent by routers to redirect a host to a better first-hop router for a specific destination or to inform hosts that a destination is in fact a neighbor (i.e., on-link). If a packet sent by the MN's interface attached to the home link triggers a router to send a Redirect Message, the Redirect Message is received by the Home Agent, because of the proxy Neighbor Advertisements. Therefore the Home Agent must forward the Redirect Message to the MN, in order to inform the MN about the better destination.

The solution described above can also be applied for a more general scenario where a node is performing transcoding or filtering for another node on the same link.

The Proxy Neighbor Advertisements in the prior art are used by a router for a node being off-link. The router will then receive the packets destined for the off-link node. If the node is on-link again, it will send Neighbor Advertisements on its own and receive the packets.

Figure 4:
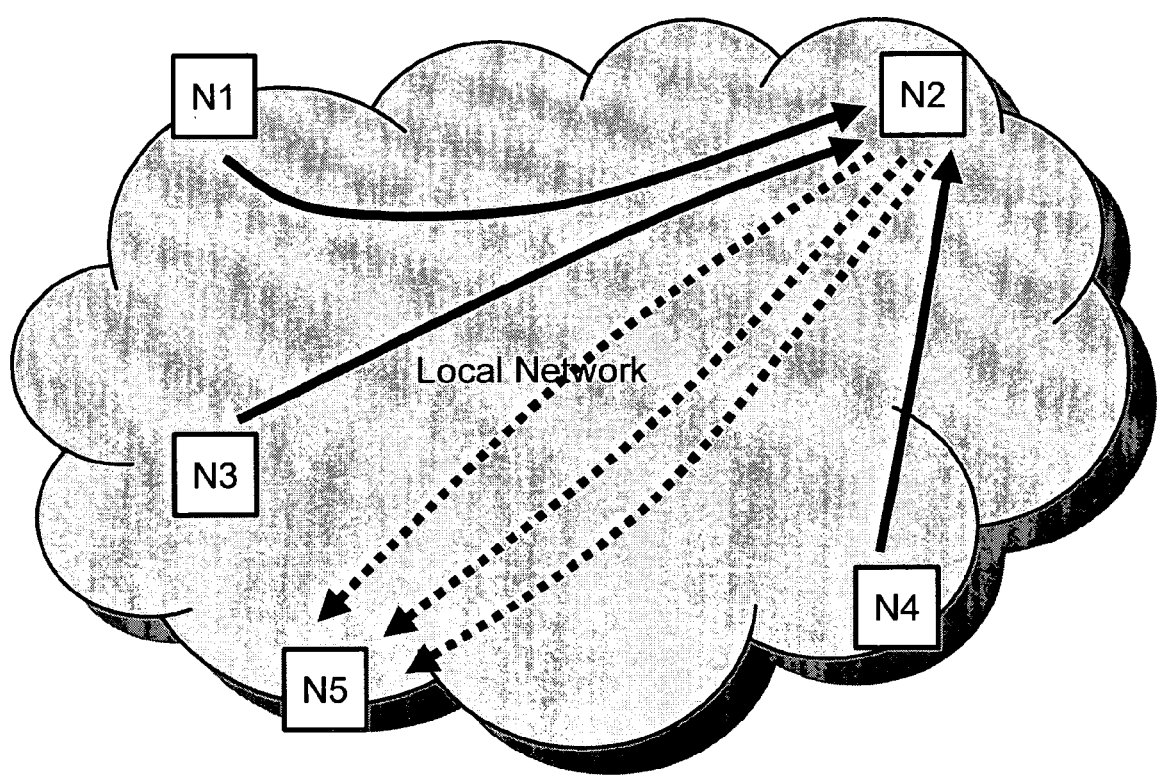
FIG. 4 shows a general scenario according to an embodiment of the invention.

In the following (see FIG. 4) a node is supposed to act as proxy for a particular other node, although the particular node is on-link. I.e. all nodes in a local network, except for one node (N2), send their traffic with the IP address of a node N5 to the link-layer address of the node N2. The node N2 itself must be able to send traffic with the IP address of the node N5 to the link-layer address of node N5. In FIG. 4 node N2 receives all traffic destined to N5 and forwards the traffic to N5 after some possible processing.

For this it is required that the mapping for node N5 is different in the Neighbor Cache of the node N2 and the Neighbor Caches of the other nodes in the local network.

Further the node N2 must send proxy Neighbor Advertisements for node N5 with its own link-layer address and the node N5 is not allowed to send Neighbor Advertisements.

The key features of the general solution can be be described as follows. One node N5 requests another node N2 to receive and forward packets destined to N5's IP address. Thus 2 nodes on the same link (N2 and N5) are receiving packets for the same IP address (but with different link-layer addresses). The 2 nodes are only using their normal IP and link-layer addresses to communicate with each other. N2 is sending proxy Neighbor Advertisements with its link-layer address as destination address for N5's IP address. The other node N5 does not send Neighbor Advertisements. N2 knows the link-layer address of N5 and sends packets with N5's IP address to the link-layer address of N5. N5 can take over the reception by stopping N2 to send proxy Neighbor Advertisements and sending Neighbor Advertisements by its own.

Figure 5:
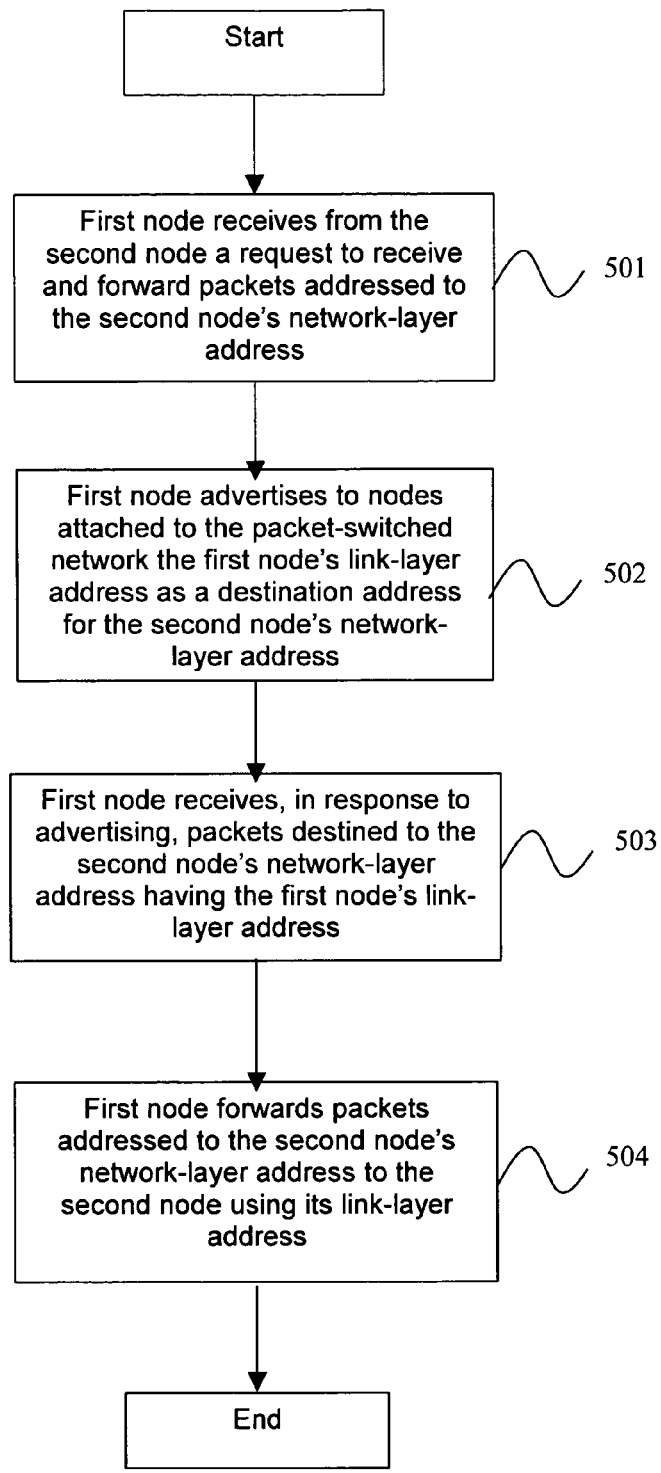
FIG. 5 is a flow diagram according to an embodiment of the invention.

A generalized version of the above is also shown in the flow diagram of FIG. 5, in which in step 501 the first node receives from the second node a request to receive and forward packets addressed to the second node's network-layer address. In step 502 the first node advertises to nodes attached to the packet-switched network the first node's link-layer address as a destination address for the second node's network-layer address. Thereafter, in step 503, the first node receives, in response to advertising, packets destined to the second node's network-layer address having the first node's link-layer address. Then, in step 504, the first node forwards packets addressed to the second node's network-layer address to the second node using its link-layer address.

Another embodiment of the invention relates to the implementation of the above described various embodiments using hardware and software. It is recognized that the various above mentioned methods may be implemented using computing devices (process) as for example general purposes processors, digital signal processors (DSP), application specific integrated circuits (ASIC), field programmable gate arrays (FPGA), and other programmable logic devices, etc. The various embodiments of the invention may also be performed or embodied by a combination of these devices.

Further, the various embodiments of the invention may also be implemented by means of software modules, which are executed by a processor, or directly in hardware. Also a combination of software modules and a hardware implementation may be possible. The software models may be stored in any kind of computer readable storage medium for example RAM, EPROM, EEPROM, flash memory, registers, hard disks, CD-ROM, DVD, etc.

The invention claimed is:

1. A method for controlling the forwarding of packets destined to a mobile node, wherein the mobile node is attached to a home link, a home agent on the home link is configured to intercept packets destined to the mobile node's home address, and at least one router other than the home agent is on the home link, the method comprising the following steps:

receiving from the mobile node a request to receive and forward packets addressed to the mobile node's home address, wherein the mobile node includes a link-layer address of the mobile node in the request;

advertising on behalf of the mobile node, on the home link, the home agent's link-layer address as a destination address for the mobile node's home address;

stopping, by the mobile node, an operation of advertising to the at least one router on the home link the mobile node's link-layer address as the destination address for the mobile node's home address when the mobile node attaches to the home link;

receiving from the at least one router in response to the advertising of the home agent's link-layer address, the packets destined to the mobile node's home address having the home agent's link-layer address; and forwarding, by the home agent, all of the packets addressed to the mobile node's home address to the mobile node using the mobile node's link-layer address.

2. The method according to claim 1, wherein the home agent maps the mobile node's home address to the mobile node's link layer address.

3. The method according to claim 2, wherein neighbor caches of nodes attached to the home link are updated with the home agent's link-layer address as a destination address for the mobile node's home address.

4. A system for controlling the forwarding of packets destined to a mobile node, comprising:

the mobile node attached to a home link;

a home agent on the home link configured to intercept packets destined to the mobile node's home address; and at least one router on the home link other than the home agent, wherein:

the home agent is further configured to receive from the mobile node a request to receive and forward packets addressed to the mobile node's home address, wherein the mobile node includes the mobile node's link-layer address in the request;

the home agent is further configured to advertise on the home link the home agent's link-layer address as a destination address for the mobile node's home address;

the mobile node is configured to stop an operation of advertising to the at least one router on the home link the mobile node's link-layer address as the destination address for the mobile node's home address when the mobile node attaches to the home link;

the home agent is further configured to receive from the at least one router, in response to the advertising of the home agent's link-layer address, the packets destined to the mobile node's home address having the home agent's link-layer address; and the home agent is further configured to forward all of the packets addressed to the mobile node's home address to the mobile node using the mobile node's link-layer address.

5. The system according to claim 4, wherein the home agent maps the mobile node's home address to the mobile node's link layer address.

6. The system according to claim 5, wherein neighbor caches of nodes attached to the home link are updated with the home agent's link-layer address as a destination address for the mobile node's home address.

7. A mobile node attached to a home link, wherein a home agent on the home link is configured to intercept packets addressed to the mobile node's home address, and at least one router other than the home agent is on the home link, the mobile node comprising:
   a transmitting unit configured to include the mobile node's link-layer address in a binding update message and send the message to the home agent;
   a stopping unit configured to stop an operation of advertising to the at least one router on the home link the mobile node's link-layer address as a destination address for the mobile node's home address when the mobile node attaches to the home link; and
   a receiving unit configured to receive the packets addressed to the mobile node's home address at the mobile node's link-layer address forwarded from the home agent, wherein the home agent forwards to the mobile node all of the packets addressed to the mobile node's home address.

8. A mobile node attached to a home link, wherein the mobile node comprises a plurality of interfaces, and at least one of the interfaces is attached to a foreign link and assigned the mobile node's care-of address, wherein a home agent on the home link is configured to intercept packets addressed to the mobile node's home address, and at least one router other than the home agent is on the home link, the mobile node comprising:
   a transmitting unit configured to include the mobile node's link-layer address in a binding update message and send the message to the home agent;
   a stopping unit configured to stop an operation of advertising to the at least one router on the home link the mobile node's link-layer address as a destination address for the mobile node's home address when the mobile node attaches to the home link, and
   a receiving unit configured to receive the packets forwarded from the home agent addressed to the mobile node's home address either at the mobile node's link-layer address or by tunneling to the care-of address, wherein the home agent forwards to the mobile node all of the packets addressed to the mobile node's home address.

9. The mobile node according to claim 8, wherein the home agent decides to send the packets addressed to the mobile node's home address directly to the home address on the home link or tunnel to the care-of address.

10. A method for controlling the forwarding of packets destined to a mobile node, wherein the mobile node is attached to a home link, and wherein the mobile node comprises a plurality of interfaces, and at least one of the interfaces is attached to a foreign link and assigned the mobile node's care-of address, a home agent on the home link is configured to intercept packets destined to the mobile node's home address, and at least one router other than the home agent is on the home link, the method comprising the following steps:
   receiving from the mobile node a request to receive and forward packets addressed to the mobile node's home address, wherein the mobile node includes a link-layer address of the mobile node in the request;
   advertising on behalf of the mobile node, on the home link, the home agent's link-layer address as a destination address for the mobile node's home address;
   stopping, by the mobile node, an operation of advertising to the at least one router on the home link the mobile node's link-layer address as the destination address for the mobile node's home address when the mobile node attaches to the home link;
   receiving from the at least one router in response to the advertising of the home agent's link-layer address, the packets destined to the mobile node's home address having the home agent's link-layer address; and
   forwarding, by the home agent, all of the packets addressed to the mobile node's home address to the mobile node either using the mobile node's link-layer address or by tunneling to the care-of address.

11. The method according to claim 10, wherein the home agent decides to send the packets addressed to the mobile node's home address directly to the home address on the home link or tunnel to the care-of address.

12. A system for controlling the forwarding of packets destined to a mobile node, comprising:
   the mobile node attached to a home link, wherein the mobile node comprises a plurality of interfaces, and at least one of the interfaces is attached to a foreign link and assigned the mobile node's care-of address,
   a home agent on the home link configured to intercept packets destined to the mobile node's home address; and
   at least one router on the home link other than the home agent, wherein:
   the home agent is further configured to receive from the mobile node a request to receive and forward packets addressed to the mobile node's home address, wherein the mobile node includes the mobile node's link-layer address in the request;
   the home agent is further configured to advertise on the home link the home agent's link-layer address as a destination address for the mobile node's home address;
   the mobile node is configured to stop an operation of advertising to the at least one router on the home link the mobile node's link-layer address as the destination address for the mobile node's home address when the mobile node attaches to the home link;
   the home agent is further configured to receive from the at least one router, in response to the advertising of the home agent's link-layer address, the packets destined to the mobile node's home address having the home agent's link-layer address; and
   the home agent is further configured to forward to the mobile node all of the packets addressed to the mobile node's home address using either the mobile node's link-layer address, or by tunneling to the care-of address.

13. The system according to claim 12, wherein the home agent decides to send the packets addressed to the mobile node's home address directly to the home address on the home link or tunnel to the care-of address.

* * * * *

UNITED STATES PATENT AND TRADEMARK OFFICE
CERTIFICATE OF CORRECTION

| | | |
|---|---|---|
| PATENT NO. | : 8,170,010 B2 | |
| APPLICATION NO. | : 12/067137 | |
| DATED | : May 1, 2012 | |
| INVENTOR(S) | : Jens Bachmann et al. | |

It is certified that error appears in the above-identified patent and that said Letters Patent is hereby corrected as shown below:

On the Title Page:

Item (54) and in the specification, Column 1, line 1, Title, incorrectly reads:

"MULTIPLE INTERFACE MOBILE NODE WITH SIMULTANEOUS HOME- AND FOREIGN NETWORK CONNECTION"

and should read:

"MULTIPLE INTERFACE MOBILE NODE WITH SIMULTANEOUS HOME AND FOREIGN NETWORK CONNECTION".

Item (22) PCT Filed incorrectly reads:
"Jan. 8, 2006"
and should read
"Aug. 1, 2006".

Item (30) Foreign Application Priority Data incorrectly reads:
"Sep. 19, 2005   (EP)   05020354"
and should read
"Sep. 19, 2005   (EP)   05020354.6".

Item (56) References Cited, Other Publications, omits and should include:
"International Search Report dated September 28, 2006.".

Signed and Sealed this
Second Day of July, 2013

Teresa Stanek Rea
*Acting Director of the United States Patent and Trademark Office*